(12) United States Patent
Huh

(10) Patent No.: US 8,526,619 B2
(45) Date of Patent: Sep. 3, 2013

(54) SYSTEM AND METHOD OF RESTRICTING RECORDING OF CONTENTS USING DEVICE KEY OF CONTENT PLAYBACK DEVICE

(75) Inventor: Mi Suk Huh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 875 days.

(21) Appl. No.: 12/104,985

(22) Filed: Apr. 17, 2008

(65) Prior Publication Data
US 2009/0136039 A1   May 28, 2009

(30) Foreign Application Priority Data

Nov. 22, 2007   (KR) .................. 10-2007-0119811

(51) Int. Cl.
*H04L 29/06* (2006.01)

(52) U.S. Cl.
USPC ............ 380/277; 380/278; 380/203; 713/193

(58) Field of Classification Search
USPC ...... 380/203, 277–279; 713/193; 705/51–57
See application file for complete search history.

(56) References Cited

U.S. PATENT DOCUMENTS

| | | | | |
|---|---|---|---|---|
| 7,457,414 B1 * | 11/2008 | Kahn et al. | ...................... | 380/201 |
| 7,634,816 B2 * | 12/2009 | Alkove et al. | ...................... | 726/27 |
| 2002/0157002 A1 * | 10/2002 | Messerges et al. | ........... | 713/155 |
| 2003/0152222 A1 * | 8/2003 | Nakano et al. | ................ | 380/201 |
| 2004/0243814 A1 * | 12/2004 | Nakano et al. | ................ | 713/189 |
| 2005/0229225 A1 * | 10/2005 | Klausberger et al. | ......... | 725/112 |
| 2007/0033418 A1 * | 2/2007 | Okawa | ........................... | 713/192 |
| 2007/0079381 A1 * | 4/2007 | Hartung et al. | ................. | 726/26 |
| 2007/0094505 A1 * | 4/2007 | Futa et al. | ..................... | 713/176 |
| 2007/0198413 A1 * | 8/2007 | Nagao | ............................. | 705/50 |
| 2008/0120666 A1 * | 5/2008 | Guzman et al. | ............... | 725/110 |
| 2008/0301437 A1 * | 12/2008 | Chevallier et al. | ........... | 713/155 |
| 2010/0023760 A1 * | 1/2010 | Lee et al. | ...................... | 713/158 |

FOREIGN PATENT DOCUMENTS

| | | |
|---|---|---|
| KR | 10-2001-0069723 | 7/2001 |
| KR | 10-2007-0003298 | 1/2007 |
| KR | 10-2007-0053032 | 5/2007 |
| KR | 10-2007-0064084 | 6/2007 |
| KR | 10-2007-0082405 | 8/2007 |
| WO | WO 01/48755 | 7/2001 |

OTHER PUBLICATIONS

English language abstract of KR 10/2001-0069723, published Jul. 25, 2001.
English language abstract of KR 10-2007-0003298, published Jan. 5, 2007.

(Continued)

*Primary Examiner* — Michael Simitoski
*Assistant Examiner* — Ali Shayanfar
(74) *Attorney, Agent, or Firm* — NSIP Law

(57) ABSTRACT

The present invention relates to a system and method for restricting recording of contents using a device key of a content reproduction device. A content recording device includes a content recording unit for encrypting contents using a Content Encryption Key (CEK) and recording the encrypted contents in a recording medium; a CEK transmitting/receiving unit for transmitting the CEK to at least one content reproduction device, and receiving, from the at least one content reproduction device, an encrypted CEK being encrypted using a device key of each of the at least one content reproduction device; and a CEK recording unit for recording the encrypted CEK in the recording medium.

19 Claims, 6 Drawing Sheets

(56) References Cited

OTHER PUBLICATIONS

English language abstract of KR 10-2007-0053032, published May 23, 2007.

English language abstract of KR 10-2007-0064084, published Jun. 20, 2007.

English language abstract of KR 10-2007-0082405, publised Aug. 21, 2007.

\* cited by examiner

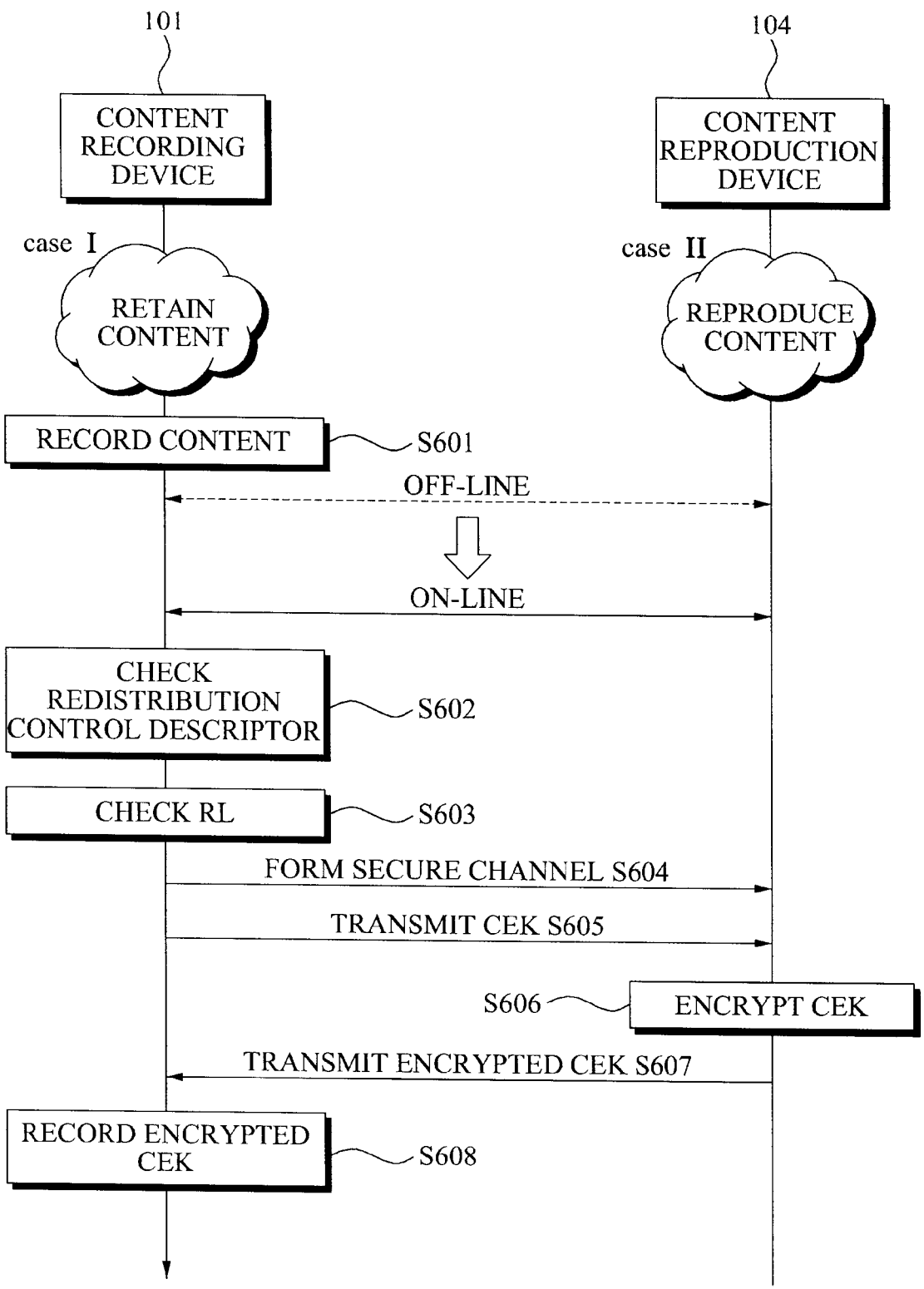

SYSTEM AND METHOD OF RESTRICTING RECORDING OF CONTENTS USING DEVICE KEY OF CONTENT PLAYBACK DEVICE

CROSS-REFERENCE TO RELATED APPLICATION

This application claims the benefit of Korean Patent Application No. 10-2007-0119811, filed on Nov. 22, 2007, in the Korean Intellectual Property Office, the entire disclosure of which is incorporated herein by reference.

BACKGROUND OF THE INVENTION

1. Field of the Invention

The present invention relates to a system and method for restricting recording of contents using a device key of a content reproduction device, and more particularly, to a system and method for restricting recording of contents using a device key of a content playback device which encrypts a Content Encryption Key (CEK) of contents intended to be recorded using the device key of the content reproduction device, and records the encrypted CEK in a recording medium. The present invention may be applicable to a system for receiving digital broadcasting and recording the broadcasting contents.

2. Description of Related Art

Digital broadcasting has been popularized along with the development of broadcasting technologies. The digital broadcasting provides images with a relatively clear resolution to viewers, and also provides convenience in the storage, edition, and distribution for the images. However, contents of the digital broadcasting, which is transmitted in a state of not being encrypted due to the development of storage technology and computer technology for digital media, has been unrestrictedly copied and distributed while maintaining the same video quality as in the original using a personal video recorder (PVR) of a receiver or a television receiving card. Specifically, movies and dramas manufactured with a large amount of cost are easily copied and distributed, and thus the manufacturers suffer from economic loss.

Many problems occurring in the distribution of digital contents are not avoidable in view of characteristics of the digital contents. Accordingly, there is a need for a method of effectively restricting the record and distribution of the digital contents.

SUMMARY OF THE INVENTION

An aspect of the present invention provides a system and method for restricting recording of contents using a device key of a content reproduction device, in which a Content Encryption Key (CEK) of contents intended to be recorded is encrypted using the device key of the content reproduction device, and the encrypted CEK is recorded in a recording medium. In this instance, the content reproduction device may reproduce the recording medium where the encrypted CEK is recorded, thereby preventing the contents from being unrestrictedly recorded and distributed.

An aspect of the present invention provides a system and method for restricting recording of contents using a device key of a content reproduction device, in which a CEK is encrypted using the device key of the content reproduction device excluded from a valid version of a Revocation List (RL) and registered in a content recording device, thereby restricting recording of the contents.

An aspect of the present invention provides a system and method for restricting recording of contents using a device key of a content reproduction device, in which a CEK is transmitted via a secure channel, and the CEK is encrypted using a device key which is not exposed to the outside, thereby recording contents more securely and minimizing the possibility of hacking the contents.

According to an aspect of the present invention, there is provided a content recording device, which includes a content recording unit for encrypting contents using a Content Encryption Key (CEK) and recording the encrypted contents in a recording medium; a CEK transmitting/receiving unit for transmitting the CEK to at least one content reproduction device, and receiving, from the at least one content reproduction device, an encrypted CEK being encrypted using a device key of each of the at least one content reproduction device; and a CEK recording unit for recording the encrypted CEK in the recording medium.

In this instance, the content recording device may further include a Revocation List (RL) comparison unit for comparing an RL with respect to a content reproduction device with information about each of the at least one content reproduction device.

According to an aspect of the present invention, there is provided a content reproduction device, which includes a CEK encrypting unit for encrypting a CEK with respect to contents using a device key; and a CEK transmitting/receiving unit for transmitting the CEK from a content recording device, and receiving an encrypted CEK being encrypted using the device key in the content recording device.

According to an aspect of the present invention, there is provided a method for recording contents, which includes encrypting contents using a Content Encryption Key (CEK), and recording the encrypted contents in a recording medium by a content recording device; transmitting the CEK to at least one content reproduction device by the content recording device; encrypting, by each of the at least one content reproduction device, the CEK using a device key of each of the at least one content reproduction device; receiving the encrypted CEK from each of the at least one content reproduction device by the content recording device; and recording, in the recording medium by the content recording device, the encrypted CEK.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which:

FIG. 6 is a flowchart illustrating a content recording method in the case of being off-line between the content recording device and the content reproduction device of FIG. 1.

DETAILED DESCRIPTION OF EXEMPLARY EMBODIMENTS

Figure 1:
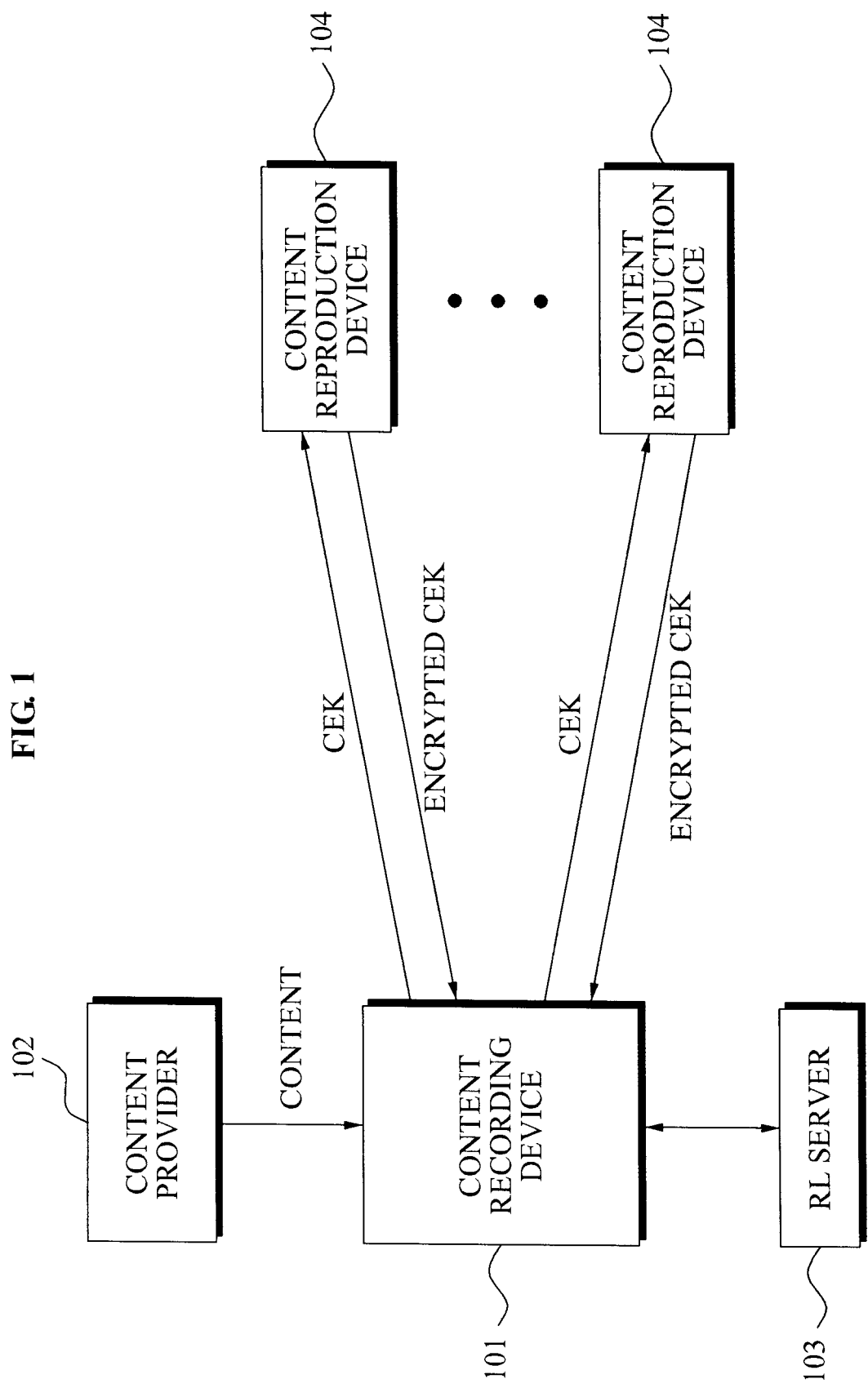
FIG. 1 is a diagram illustrating a configuration of a content recording system for restricting recording of contents using a content recording device and a content reproduction device according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a diagram illustrating a configuration of a content recording system for restricting recording of contents using a content recording device 101 and a content reproduction device 104 according to an exemplary embodiment of the present invention.

Referring to FIG. 1, the content recording system may include the content recording device 101, a content provider 102, a Revocation List (RL) server 103, and at least one content reproduction device 104.

The content provider 102 may provide contents to the content recording device 101. In this instance, the content provider 102 may restrict contents capable of being recorded by the content recording device according to rules determined in advance, and also may restrict the content reproduction device. Specifically, the content recording system may allow the content recording device 101 to control to record contents provided by the content provider 102 in a recording medium in order to protect the contents. In this instance, the content recording device 101 may encrypt the contents using a Content Encryption Key (CEK) and record the encrypted CEK in the recording medium. As an example, the content recording device 101 may include a broadcasting data receiver and a set-top box capable of recording. Specifically, the content recording device 101 may transmit the CEK to each of the at least one content reproduction device 104. The content reproduction device 104 may encrypt the CEK using a device key of the content reproduction device 104, and retransmit the encrypted CEK to the content recording device 101. Then, the content recording device 101 may record the encrypted CEK in the recording medium where content is stored. In this instance, the content reproduction device 104 may be a reproduction device registered in advance in the content recording device 101.

Thus, the content reproduction device 104 may reproduce only the recording medium where the CEK encrypted using the device key of the content reproduction device 104 is recorded. Specifically, the content provider 102 registers the content reproduction device 104 having a reproducing authorization in advance, and encrypts a CEK using an unique device key of the registered content reproduction device 104 to thereby record the encrypted CEK in the recording medium, thereby preventing contents from being unrestrictedly recorded. The content recording system will be hereinafter described in detail with reference to FIGS. 2 and 3.

Figure 2:
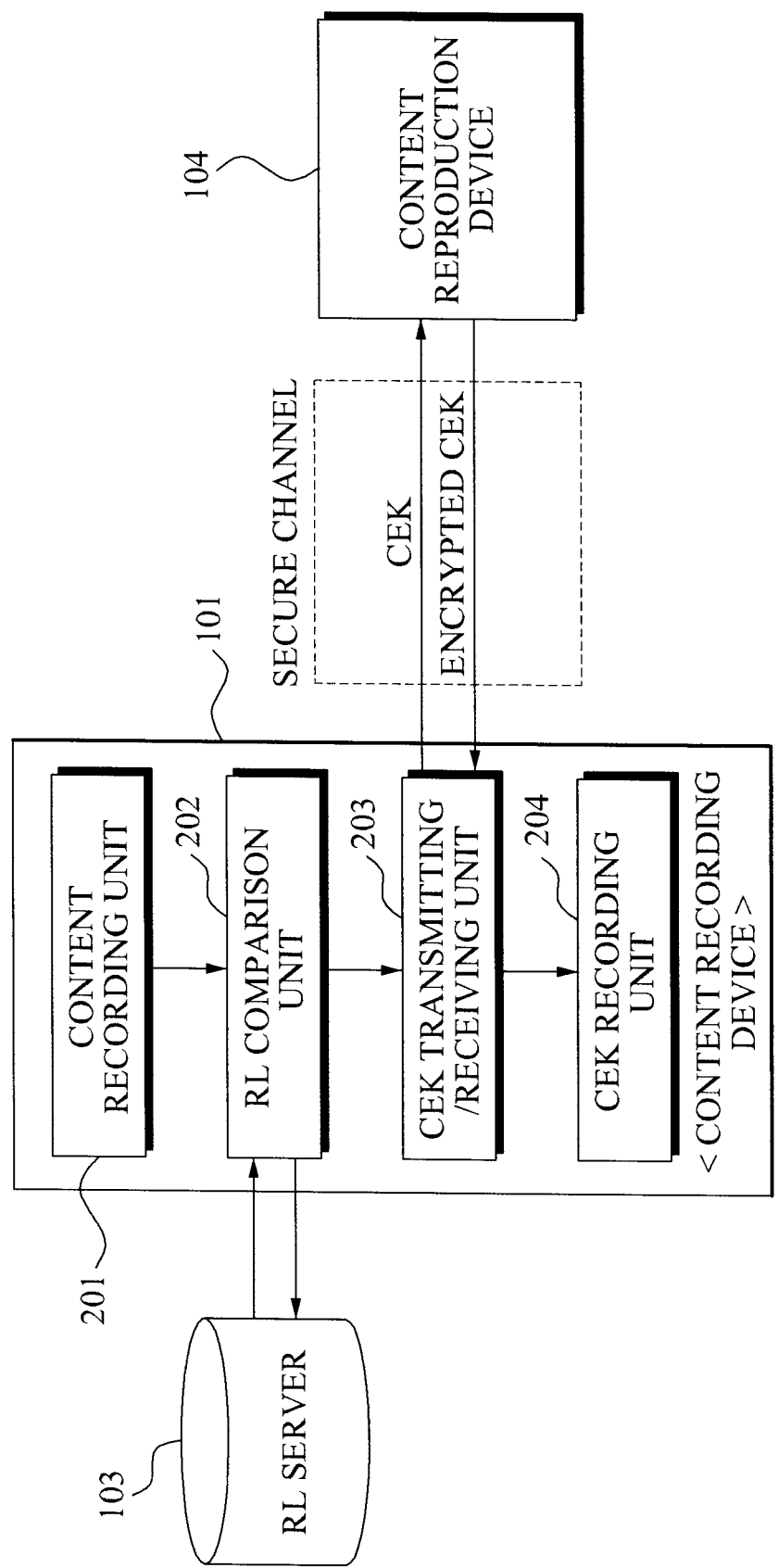
FIG. 2 is a block diagram illustrating a specific configuration of the content recording device of FIG. 1.

FIG. 2 is a block diagram illustrating a specific configuration of the content recording device 110 of FIG. 1. Referring to FIG. 2, the content recording device 101 includes a content recording unit 201, a RL comparison unit 202, a CEK transmitting/receiving unit 203, and a CEK recording unit 204. As illustrated in FIG. 2, a single content reproduction device 104 is shown, however, the content reproduction device 104 may be utilized in other content reproduction devices in the same manner as described with reference to FIG. 2.

The content recording unit 201 may encrypt contents using a CEK, and record the encrypted CEK in the recording medium. Specifically, the content recording unit 201 may verify whether the contents are recordable when receiving a record request for selected contents. In this instance, the content recording unit 201 may verify whether the selected contents are recordable depending on content recording rules determined by the content provider 102. Then, the content recording unit 201 may generate a CEK with respect to the selected contents, and encrypt the contents using the generated CEK.

The content recording unit 201 may encrypt contents in the recording medium. The recording medium may be a hard disk (HD) included in the content recording device 101 and a digital video disk (DVD) capable of writing and erasing data. As an example, the recording medium may be a personal video recorder (PVR) of a set-top box receiving digital contents, or a digital video recorder (DVR).

The RL comparison unit 202 may compare an RL with respect to the content reproduction device and information about the content reproduction device. Specifically, the RL comparison unit 202 may determine whether the content reproduction device 104 intended to be reproduced is hacked using the RL. When the content reproduction device 104 is included in the RL, it is determined that the content reproduction device 104 is hacked.

In this instance, the RL comparison unit 202 may check a version of the RL, and update the version of the RL to a valid version defined by content recording rules when the version of the RL is invalid. The RL comparison unit 202 may request an RL corresponding to a recent valid version to the RL server 103, and receive the requested RL.

When the content reproduction device 104 is included in the RL, the content reproduction device 104 does not have an authorization enabling reproducing of contents, and thus the content reproduction device 104 cannot reproduce the contents. Conversely, when the content reproduction device 104 is not included in the RL, it may be determined that the content reproduction device 104 is not hacked, and thus the content reproduction device 104 can reproduce the contents.

The CEK transmitting/receiving unit 203 may transmit the generated CEK to the content reproduction device 104, and receive, from the content reproduction device 104, a CEK encrypted using a device key of the content reproduction device 104. In this instance, the device key denotes an unique value of the content reproduction device 104, and also denotes a key incapable of being exposed to the outside. Specifically, the content reproduction device 104 does not transmit its own device key to the content recording device 101, and may transmit the CEK encrypted using its own device key to the content recording device 101. In this instance, the CEK transmitting/receiving unit 202 is registered in the content recording device 101, and may transmit the CEK to the content reproduction device 104 which is not included in the RL.

The CEK transmitting/receiving unit 202 may transmit the CEK and receive the encrypted CEK via a secure channel formed by the content reproduction device 104. In this instance, the secure channel may differ from each content reproduction device 104. As an example, the secure channel may be formed using either a private key being shared in advance with each of the at least one content reproduction device 104, or a certificate of each of the at least one content reproduction device 104. The secure channel has a relatively strong security function, and information transmitted via the secure channel is not likely to be exposed to the outside.

The CEK recording unit 204 may record the encrypted CEK received from the content reproduction device 104 in the recording medium where the contents are recorded. Specifically, both the contents encrypted using the CEK and at least one CEK encrypted using the device key of each of the at least one content reproduction device 104 may be recorded in the recording medium. That is, according to the present exemplary embodiment, the contents are controlled to be recorded using an unique device key of the content reproduction device 104, thereby preventing contents from being illicitly recorded.

Figure 3:
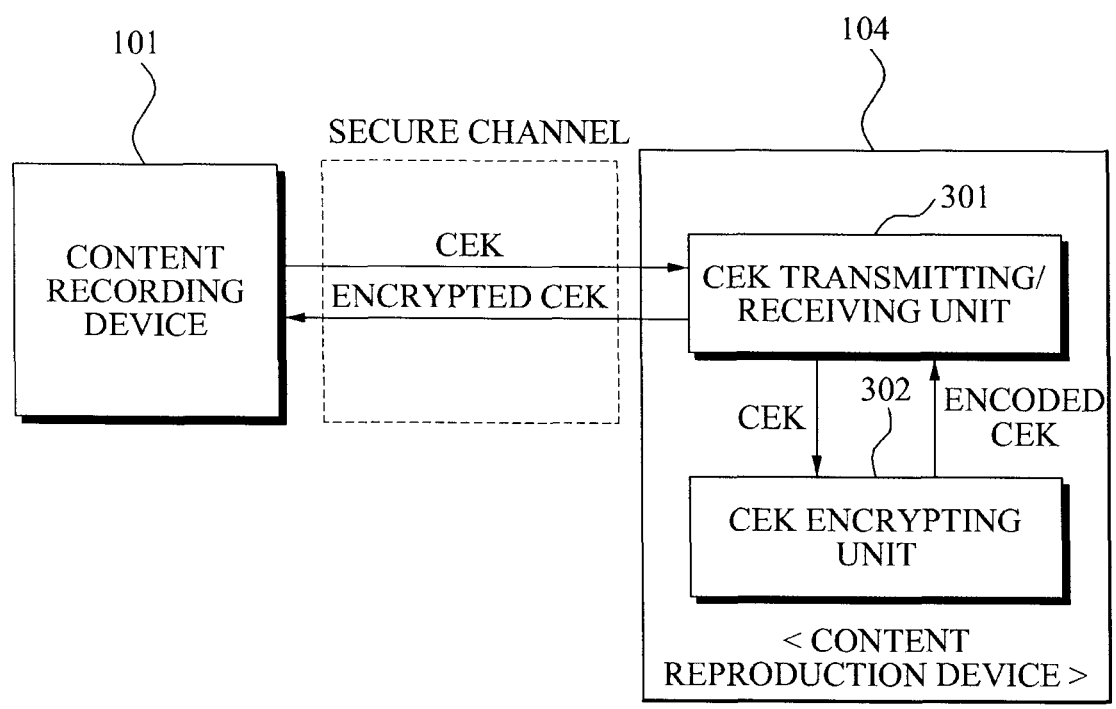
FIG. 3 is a block diagram illustrating a specific configuration of the content reproduction device of FIG. 1.

FIG. 3 is a block diagram illustrating a specific configuration of the content reproduction device 140 of FIG. 1. Referring to FIG. 3, the content reproduction device 104 may include a CEK transmitting/receiving unit 301 and a CEK encrypting unit 302.

The CEK transmitting/receiving unit 301 may receive a CEK with respect to contents from the content recording device 101, and transmit a CEK encrypted using a device key to the content recording device 101. The CEK transmitting/receiving unit 301 may transmit the encrypted CEK to the content recording device 101, when the content reproduction device 104 is not included in the RL. In this instance, the CEK transmitting/receiving unit 301 may form a secure channel with the content recording device 101, receive the CEK via the secure channel, and transmit the encrypted CEK via the secure channel. As described above, the secure channel may be formed using either the private key being shared in advance with the content reproduction device 104, or the certificate of the content reproduction device 104.

The CEK encrypting unit 302 may encrypt a CEK with respect to contents using a device key. In this instance, the device key has an unique value for each content reproduction device, and is prevented from being exposed to the outside. Thus, according to the present exemplary embodiment, the device key is not directly recorded in the recording medium, and a CEK encrypted using the device key may be recorded in the recording medium.

Figure 4:
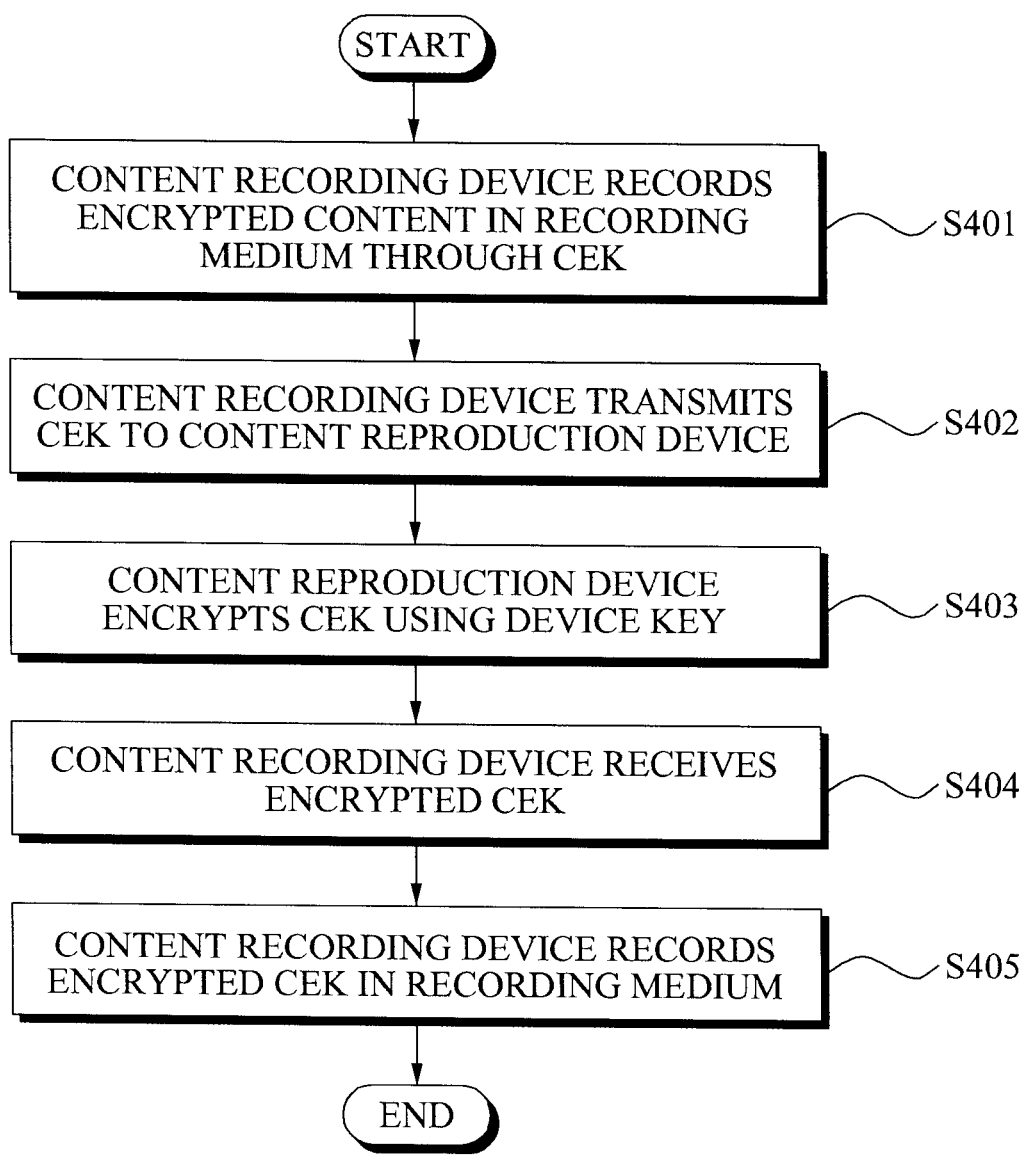
FIG. 4 is a flowchart illustrating a specific process of a content recording method according to an exemplary embodiment of the present invention.

FIG. 4 is a flowchart illustrating a specific process of a content recording method according to an exemplary embodiment of the present invention. Processes which will be described in detail below may be applicable to a single content recording device and a plurality of content reproduction devices, respectively.

In the content recording method according to the present exemplary embodiment, the content recording device 101 records contents encrypted using a CEK in the recording medium in operation S401. The content recording device 101 verifies whether the contents are recordable according to content recording rules, and generates a CEK, when receiving a record request for the contents recorded in the content recording device 101. Then, the contents are encrypted using the generated CEK, and the encrypted contents are recorded in the recording medium.

In the content recording method according to the present exemplary embodiment, the content recording device 101 transmits the CEK to the content reproduction device 104 in operation S402. In this instance, the content recording device 101 may transmit the CEK via a secure channel formed by the content reproduction device 104.

In the content recording method according to the present exemplary embodiment, the content reproduction device 104 encrypts the CEK using a device key of the content reproduction device 104 in operation S403. In this instance, the device key differs from each content reproduction device 104, and thus a number of the encrypted CEK corresponds to a number of the content reproduction device 104.

In the content recording method according to the present exemplary embodiment, the content recording device 101 receives the CEK encrypted by the content reproduction device 104 in operation S404. In this instance, as illustrated in operation S402, the content recording device 101 may receive the encrypted CEK though the secure channel formed by the content reproduction device 104.

In the content recording method according to the present exemplary embodiment, the content recording device 101 records the encrypted CEK in the recording medium in operation S405. Specifically, both the contents recorded by the content recording device 101 in operation S401 and the CEK encrypted using the device key of each content reproduction device 104 may be recorded in the recording medium. The recording medium may include a DVD and HD.

Figure 5:
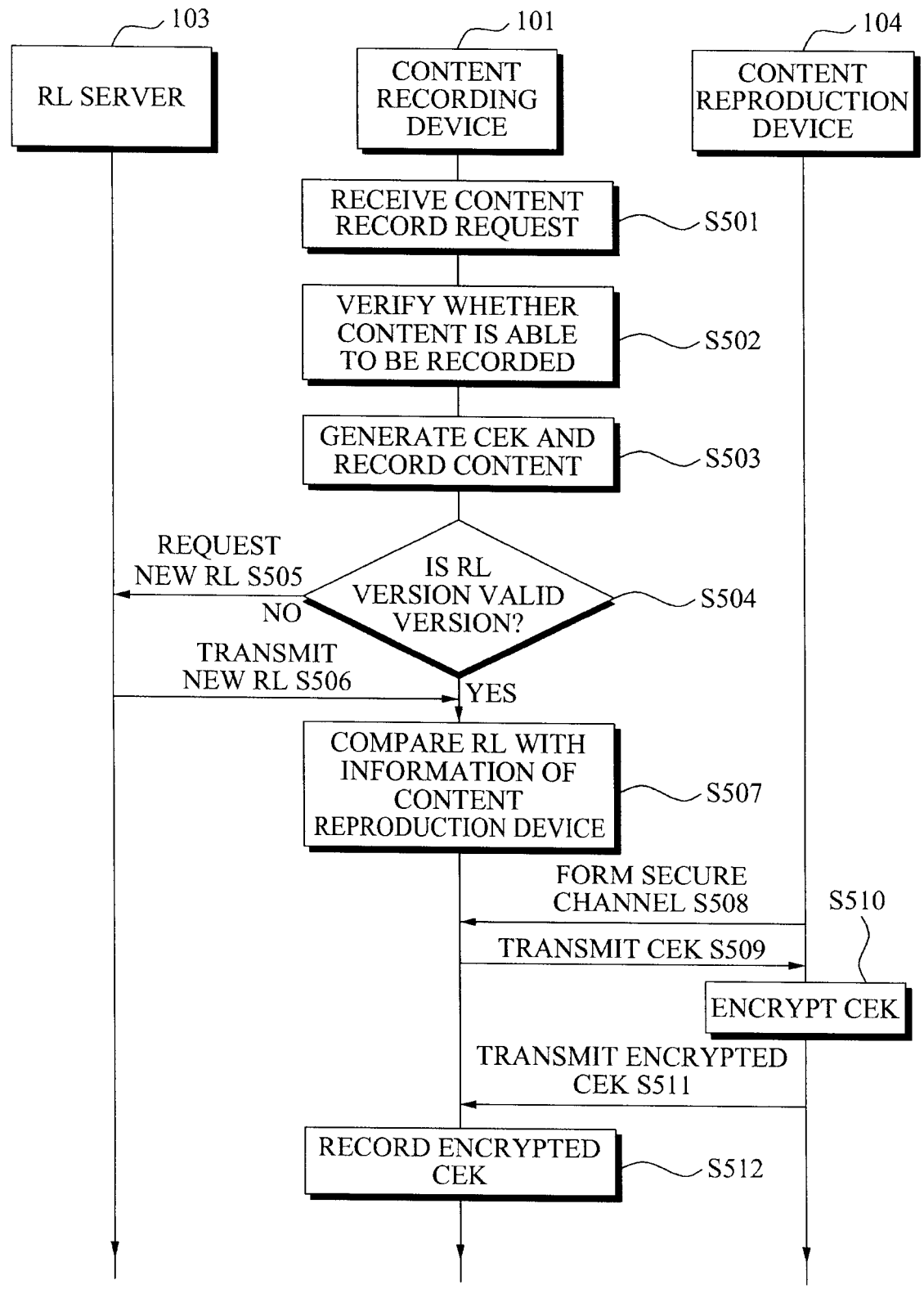
FIG. 5 is a flowchart illustrating a content recording method through an execution process between the content recording device and the content reproduction device of FIG. 1.

FIG. 5 is a flowchart illustrating a content recording method through an execution process between the content recording device 101 and the content reproduction device 104 of FIG. 1.

In operation S501, the content recording device 101 may receive a record request for selected contents. In this instance, the contents denote contents retained by the content recording device 101. For example, in the case where the content recording device 101 is a digital broadcasting set-top box, the content recording device 101 receives a content record request for contents on the air. However, the content recording process may be restricted by rules defined in advance by the content provider 102. In this instance, the rules may include restricting the type and amount of recordable contents or restricting the content reproduction device.

In operation S502, the content recording device 101 may verify whether the selected contents are able to be recorded. When it is verified that the selected contents are able to be recorded in operation S502, the content recording device 101 may generate a CEK, encrypt the contents using the generated CEK, and then record the encrypted contents in the recording medium in operation S503.

In operation S504, the content recording device 101 may check a version of an RL, and determine whether the version of the RL is a valid version defined in the content recording rules. When the version of the RL is different from the valid version, the content recording device 101 may request the RL server 103 for a new RL in operation S505, and receive the new RL from the RL server 103 in operation S506.

Then, in operation S507, the content recording device 101 may compare the valid version of the RL with information about the content reproduction device 104, and verify whether the content reproduction device 104 is included in the RL. When the content reproduction device 104 is included in the RL, the process is finished. Conversely, when the content reproduction device 104 is not included in the RL, a secure channel is formed by the content reproduction device 104 in operation S508. In operation S509, the content recording device 101 may transmit the CEK generated in operation S503 to the content reproduction device 104 through the formed secure channel. Then, in operation S510, the content reproduction device 104 may encrypt the CEK using an unique device key of the content reproduction device 104. In operation S511, the encrypted CEK is re-transmitted to the content recording device 101 through the formed secure channel. In operation S512, the content recording device 101 may record the encrypted CEK in the recording medium where the encrypted contents are recorded.

FIG. 6 is a flowchart illustrating a content recording method in the case of being off-line between the content recording device and the content reproduction device of FIG. 1. Specifically, since the content recording device 101 and the content reproduction device 104 are off-line, the flowchart of FIG. 6 shows the case where the content recording device 101 cannot record the encrypted CEK in the recording medium.

First, in CASE|, it is considered that the content recording device 101 retains the contents. Specifically, this means the case where the recording medium exists in the content recording device 101. Although the content reproduction device 104 and the content recording device 101 are off-line, the content recording device 101 may generate a CEK with respect to the contents, and record contents encoded using the generated CEK in the recording medium in operation S601.

When the content reproduction device 104 and the content recording device 101 come on-line, the content recording device 101 may check a redistribution control descriptor and an RL with respect to the contents, respectively, in operations S602 and S603. As an example, the redistribution control descriptor is included within either a Program Map Table (PMP) or Event Information Table (EIT) of the contents. In this instance, redistribution information may be loaded in rc_description(), that is, the redistribution control descriptor located in program_number of PMP and event_id of EIT to thereby be transmitted.

Specifically, since the content reproduction device 104 is not registered due to the disconnection with the content recording device 101, the content recording device 101 may check the redistribution control descriptor for the purpose of the redistribution of the contents. Also, the content recording device 101 may check the RL and verify whether the content reproduction device 104 is included in the RL, when verifying the redistribution control descriptor of the contents.

When it is verified that the content reproduction device 104 is not included in the RL, a secure channel is formed by the content reproduction device 104 in operation S604. Then, the content recording device 101 transmits the CEK to the content reproduction device 104 via the formed secure channel in operation S605. The content reproduction device 104 encrypts the CEK using an unique device key of the content reproduction device 104 in operation S606, and transmits the encoded CEK to the content recording device 101 via the formed secure channel in operation S607. The content recording device 101 records the encoded CEK in the recording medium where the encoded contents is recorded in operation S608.

Also, in CASE☐, it is considered that the content reproduction device 104 reproduces the recording medium where the contents are recorded. Specifically, this means a case where the recording medium in which the contents are recorded exists in the content reproduction device 104. In this instance, since the content recording device 101 and the content reproduction device 104 are off-line, the contents encoded using the CEK is recorded in the recording medium, however, the CEK encoded using the device key of the content reproduction device 104 is not recorded in the recording medium.

After this, when the content recording device 101 and the content reproduction device 104 come on-line, the content reproduction device 104 may request the content recording device 101 for generation of the CEK with respect to the contents recorded in the recording medium. Then, the content recording device 101 may check a redistribution control descriptor with respect to the corresponding contents in operation S602, and also check the RL with respect to the content reproduction device in operation S603. When both the redistribution control descriptor and the RL are checked, operations S604 and S608 may be repeated. Descriptions which are not made in FIGS. 4 through 6 would be understood with reference to FIGS. 1 through 3.

The method for recording contents according to the above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

As described above, according to the present invention, there is provided a system and method for restricting recording of contents using a device key of a content reproduction device, in which a CEK of contents intended to be recorded is encrypted using the device key of the content reproduction device, and the encrypted CEK is recorded in a recording medium. In this instance, the content reproduction device may reproduce the recording medium where the encrypted CEK is recorded, thereby preventing the contents from being unrestrictedly recorded and distributed.

According to the present invention, there is provided a system and method for restricting recording of contents using a device key of a content reproduction device, in which a CEK is encrypted using the device key of the content reproduction device excluded from a valid version of a Revocation List (RL) and registered in a content recording device, thereby restricting recording of the contents.

According to the present invention, there is provided a system and method for restricting recording of contents using a device key of a content reproduction device, in which a CEK is transmitted via a secure channel, and the CEK is encrypted using a device key which is not exposed to the outside, thereby recording contents more securely and minimizing the possibility of hacking the contents.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A content recording device, comprising:
  a content recorder configured to encrypt contents using a Content Encryption Key (CEK) and configured to record the encrypted contents in a recording medium and configured to check a redistribution control descriptor in the recorded content and to check revocation list of valid version;
  a CEK transmitter/receiver configured to form a secure channel to transmit the CEK to at least one content reproduction device based on the checking of the revocation list with respect to the content reproduction device, and configured to receive, from the at least one content reproduction device over the secure channel, an encrypted CEK being encrypted using a device key of each of the at least one content reproduction device; and a CEK recorder configured to record the encrypted CEK in the recording medium.

2. The content recording device of claim 1, further comprising:
a revocation list comparator configured to compare an rl with respect to a content reproduction device with information about each of the at least one content reproduction device, wherein
the CEK transmitter/receiver transmits the CEK to a content reproduction device excluded from the rl.

3. The content recording device of claim 2, wherein the rl comparator checks a version of the rl, and updates the version of the rl to a valid version defined by content recording rules when the version of the rl is different from the valid version.

4. The content recording device of claim 1, wherein the CEK transmitter/receiver transmits the CEK via a secure channel formed by each of the at least one content reproduction device, and receives the encrypted CEK via the secure channel.

5. The content recording device of claim 4, wherein the secure channel is formed using either a private key being shared in advance with each of the at least one content reproduction device, or a certificate of each of the at least one content reproduction device.

6. A content reproduction device, comprising:
a content recording device configured to check a redistribution control descriptor in the recorded content and to check revocation list of valid version for the purpose of redistribution of contents and a revocation list;
a CEK encryptor configured to encrypt a CEK with respect to contents using a device key; and a CEK transmitter/receiver configured to receive the CEK from secure channel to the content recording device when the content reproduction device is excluded based on the checking of the revocation list, and configured to transmit over secure channel to an encrypted CEK being encrypted using the device key in the content recording device.

7. The content reproduction device of claim 6, wherein the CEK encryptor encrypts the CEK using the device key having an unique value for each content reproduction device.

8. The content reproduction device of claim 6, wherein the CEK transmitter/receiver forms a secure channel with the content recording device, and transmits that CEK and receives the encrypted CEK via the secure channel.

9. A method for recording contents, the method comprising:
encrypting contents using a Content Encryption Key (CEK), and recording the encrypted contents in a recording medium by a content recording device;
transmitting the CEK to at least one content reproduction device by the content recording device, the content recording device configured to check a redistribution control descriptor in the recorded content and to check a revocation list (rl) of valid version; encrypting, by each of the at least one content reproduction device, the CEK using a device key of each of the at least one content reproduction device based on the checking of the revocation list; receiving the encrypted CEK from each of the at least one content reproduction device from a secure channel; and recording, in the recording medium by the content recording device, the encrypted CEK.

10. The method of claim 9, further comprising:
comparing the revocation list with respect to a content reproduction device with information about each of the at least one content reproduction device by the content recording device.

11. The method of claim 10, wherein the transmitting transmits the CEK to a content reproduction device which is excluded from the rl.

12. The method of claim 10, wherein the comparing checks a version of the rl, and updates the version of the rl to a valid version defined by the content recording rules when the version of the rl is different from the valid version.

13. The method of claim 9, wherein the encrypting encrypts the CEK using the device key of each of the at least one content reproduction device by each of the at least one content reproduction device, the device key having an unique value which is different from the device key of other content reproduction devices.

14. The method of claim 9, wherein the transmitting transmits the CEK via a secure channel formed by the content reproduction device, and the receiving receives the encrypted CEK via the secure channel.

15. The method of claim 14, wherein the secure channel is formed using either a private key being shared in advance by each of the at least one content recording device and the content reproduction device, or a certificate of each of the at least one content reproduction device.

16. A non-transitory computer-readable recording medium storing a program implementing a method for recording contents, the method comprising:
encrypting contents using a Content Encryption Key (CEK), and recording the encrypted contents in a non-transitory recording medium by a content recording device, the content recording device configured to check a redistribution control descriptor in the recorded content and to check revocation list of valid version;
transmitting the CEK from secure channel to at least one content reproduction device by the content recording device based on the checking of the revocation list with respect to the content reproduction device; encrypting, by each of the at least one content reproduction device, the CEK using a device key of each of the at least one content reproduction device; receiving from a secure channel the encrypted CEK from each of the at least one content reproduction device; and recording, in the non-transitory recording medium by the content recording device, the encrypted CEK.

17. The content recording device of claim 1, wherein the content recorder is configured to record contents in the recording medium where the recording medium is a hard disk (HD), a digital video disk (DVD), personal video recorder (PVR) or digital video recorder (DVR).

18. The method of claim 9 wherein the content recording device and the content reproduction device are off-line and the redistribution control descriptor is included in a Program Map Table (PMP).

19. The method of claim 9, wherein the redistribution control descriptor is included in an Event Information Table (EIT).

* * * * *